Dec. 2, 1924.                                              1,517,317
H. O. RUSSELL ET AL
SYNCHRONIZED SHUTTER FOR USE UPON AN AIRPLANE SEARCHLIGHT
OR PROJECTED GUN SIGHT
Filed April 18, 1922
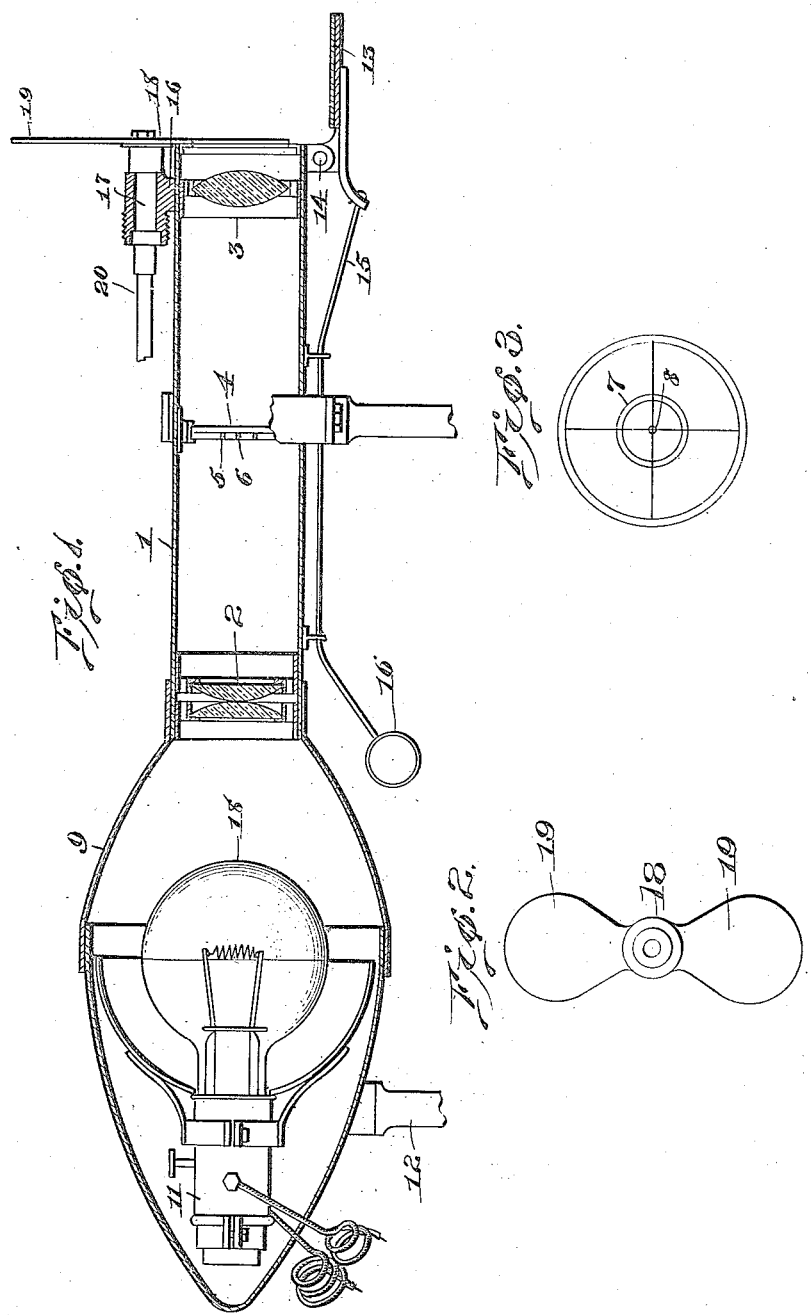
Inventors:
Herbert O. Russell
Charles Leigh Paulus
By Robert H Young       Atty.

Patented Dec. 2, 1924.

1,517,317

UNITED STATES PATENT OFFICE.

HERBERT O. RUSSELL, OF PARLIER, CALIFORNIA, AND CHARLES LEIGH PAULUS, OF DAYTON, OHIO.

SYNCHRONIZED SHUTTER FOR USE UPON AN AIRPLANE SEARCHLIGHT OR PROJECTED GUN SIGHT.

Application filed April 18, 1922. Serial No. 555,414.

*To all whom it may concern:*

Be it known that we, HERBERT O. RUSSELL and CHARLES LEIGH PAULUS, citizens of the United States, residing, respectively, at Parlier and Dayton, in the counties of Fresno and Montgomery, and States of California and Ohio, have invented certain new and useful Improvements in Synchronized Shutters for Use upon an Airplane Searchlight or Projected Gun Sight, of which the following is a specification.

This invention relates to a synchronized shutter mechanism for use upon an airplane search light of a projecting gun sight.

Tests conducted upon lights mounted in airplanes have shown that when an attempt is made to throw the light forward through the propeller, a large proportion of this light was reflected by and from the rear surface of the rotating propeller thus making it impossible for the observers in the machine to see anything when looking in that direction except a disk of light representing the rotating propeller.

The object of this invention is to provide a means for overcoming the difficulty above referred to by providing a shutter, the operation or rotation of which is synchronized with the propeller in such manner that when the propeller is in a position to receive the projected light, the shutter intervenes and operates to throw a shadow on the propeller.

With the above objects in view the invention consists in a novel construction, combination and arrangement herein fully described, illustrated and claimed.

In the accompanying drawings:

Figure 1 is a longitudinal section through the device.

Figure 2 is an elevation of the shutter.

Figure 3 is a diagram of the target shadow.

The instrument comprises in the present embodiment thereof a lens tube 1 containing in the rear end thereof condensing lens 2 and having in the forward end thereof focusing lens 3.

Between lens 2 and lens 3 is target reticle 4 comprising an annular or ring opaque portion 5' and an opaque central portion 6. When the rays are projected upon the target, the reticle 4 causes a ring-like shadow 7 to be projected upon the target and also a central dark spot or shadow 8.

To the rear end of the tube 1 there is connected a lamp casing 9 containing an electric lamp 10 held by socket 11 fastened in the casing 9. The tube 1 and casing 9 form a housing for the parts referred to and said housing is adapted to be mounted upon one or more suitable supports 12.

Mounted in forward end of the housing is shutter 13, adapted to protect the instrument, said shutter being mounted on a pivot 14 and adjusted by means of suitable operating connection 15 having at its rear end a handle or ring 16.

On the lens tube 1 adjacent to the forward end thereof there is a bearing 16 in which is journaled the shaft 17 of the rotary shutter 18 having opposite two blades 19. Each blade is of sufficient size to momentarily cut off the rays of light being projected from the lens tube thereby eliminating illumination of the blades of the propeller of the aircraft and overcoming the serious objection heretofore referred to. The shaft 17 of the rotary shutter 18 may be driven by suitable means connecting the same with the engine of the aircraft as for example; a flexible driving shaft 20.

The shutter 18 will ordinarily have the same number of blades 19 as the propeller of the aircraft and will be driven at engine speed so that the blades of shutter will work in synchronism with the blades of the aircraft propeller.

Having thus described our invention, we claim:

1. In combination with a light beam projecting apparatus for aircraft, a shutter operating in synchronism with the propeller to prevent the beam from striking the propeller.

2. In combination with a light beam projecting apparatus for aircraft, a shutter operating in synchronism with the propeller to prevent the beam from striking the propeller, said shutter being rotary and being driven by the aircraft engine.

3. In combination with a light beam projecting apparatus for aircraft, a shutter operating in synchronism with the propeller to prevent the beam from striking the propeller, said shutter being rotary and being driven by the aircraft engine and at engine speed.

In testimony whereof we affix our signatures.

HERBERT O. RUSSELL.
CHARLES LEIGH PAULUS.